United States Patent
Kommula et al.

(10) Patent No.: US 12,388,714 B2
(45) Date of Patent: Aug. 12, 2025

(54) METHODS AND APPARATUS FOR DETERMINING A PATH THAT A DATA PACKET WOULD TRAVERSE THROUGH A COMMUNICATION NETWORK AT A TIME OF INTEREST

(71) Applicant: Selector Software, Inc., Santa Clara, CA (US)

(72) Inventors: Sunanda Kommula, Cupertino, CA (US); Nitin Kumar, Fremont, CA (US); Kannan Kothandaraman, Saratoga, CA (US)

(73) Assignee: SELECTOR SOFTWARE, INC., Santa Clara, CA (US)

( * ) Notice: Subject to any disclaimer, the term of this patent is extended or adjusted under 35 U.S.C. 154(b) by 0 days.

(21) Appl. No.: 18/434,963

(22) Filed: Feb. 7, 2024

(65) Prior Publication Data
US 2025/0233796 A1    Jul. 17, 2025

Related U.S. Application Data

(60) Provisional application No. 63/621,200, filed on Jan. 16, 2024.

(51) Int. Cl.
*H04L 41/12* (2022.01)
*H04L 41/082* (2022.01)
*H04L 43/067* (2022.01)
*H04L 45/02* (2022.01)

(52) U.S. Cl.
CPC .......... *H04L 41/12* (2013.01); *H04L 41/082* (2013.01); *H04L 43/067* (2013.01); *H04L 45/02* (2013.01)

(58) Field of Classification Search
None
See application file for complete search history.

(56) References Cited

U.S. PATENT DOCUMENTS

| | | | |
|---|---|---|---|
| 7,496,650 B1 * | 2/2009 | Previdi | H04L 45/22 370/254 |
| 10,735,270 B1 * | 8/2020 | Whipple | G06F 21/604 |
| 11,323,357 B1 | 5/2022 | Mahadevan | |
| 11,354,268 B2 * | 6/2022 | Jones | G06F 13/20 |
| 2004/0213198 A1 * | 10/2004 | Mahmood | H04J 3/24 370/349 |
| 2005/0018602 A1 * | 1/2005 | Labovitz | H04L 41/142 370/254 |

(Continued)

FOREIGN PATENT DOCUMENTS

CN  111541612 A  *  8/2020
WO  WO-2004056047 A1 *  7/2004  ......... H04L 12/2602

OTHER PUBLICATIONS

International Search Report and Written Opinion of the International Searching Authority mailed Jan. 24, 2025, in International Application No. PCT/US2024/057528.

(Continued)

*Primary Examiner* — Sandarva Khanal
(74) *Attorney, Agent, or Firm* — FisherBroyles LLP

(57) ABSTRACT

This disclosure pertains to computer assisted methods, apparatus, and systems for determining a path that a data packet would have traversed through a communication network at a particular point in time, which may be used, for instance, to determine the sources of connectivity failures in a large scale communication network.

20 Claims, 12 Drawing Sheets

(56) References Cited

U.S. PATENT DOCUMENTS

| | | |
|---|---|---|
| 2014/0313937 A1 | 10/2014 | Roper |
| 2015/0200838 A1 | 7/2015 | Nadeau |
| 2015/0215206 A1 | 7/2015 | Solis |
| 2015/0271034 A1 | 9/2015 | Kanna |
| 2016/0182365 A1* | 6/2016 | Chang ................ H04L 45/021 370/352 |
| 2019/0104057 A1 | 4/2019 | Goel |
| 2019/0280962 A1* | 9/2019 | Michael ................ H04L 45/70 |
| 2020/0028762 A1 | 1/2020 | Sun |
| 2020/0285547 A1* | 9/2020 | Shukla ................ G06N 20/00 |
| 2020/0382399 A1* | 12/2020 | Tewari ................ H04L 45/20 |
| 2021/0092023 A1 | 3/2021 | Sethi |
| 2022/0094614 A1* | 3/2022 | Khurshid ............ H04L 41/147 |
| 2023/0327952 A1 | 10/2023 | Reehil, III |

OTHER PUBLICATIONS

Written Opinion of the International Searching Authority mailed May 5, 2025, in International Application No. PCT/US2025/017631.

International Search Report mailed May 5, 2025, in International Application No. PCT/US2025/017631.

\* cited by examiner

METHODS AND APPARATUS FOR DETERMINING A PATH THAT A DATA PACKET WOULD TRAVERSE THROUGH A COMMUNICATION NETWORK AT A TIME OF INTEREST

CROSS REFERENCE TO RELATED APPLICATIONS

This application claims the benefit of priority of U.S. Provisional Patent Application No. 63/621,200 filed Jan. 16, 2024, which is incorporated herein by reference in its entirety.

FIELD OF THE INVENTION

This disclosure pertains to computer-assisted methods, apparatus, and systems for tracing the sources of connectivity failures in large scale communication networks.

BACKGROUND

Communication networks provide data connectivity between any two nodes of the network. For instance, an Internet Service Provider (ISP) provides connectivity between its customers computing devices, such as computers, cellular telephones, game consoles, wearable computing devices, etc. and the Internet. Many communication networks provide connectivity between two or more additional networks (and all the devices connected to those additional networks).

When one computing device on a network, e.g., Device A at network node A, wants to communicate with another computing device on the network, e.g., Device B at network node B, it is rare that the two nodes are in direct communication with each other. More commonly, the message is relayed from Node A of the network to Node B of the network through one or more other "relay" nodes. In fact, this relay paradigm is fundamental to the concept of mesh networks, such as the Internet.

When one of the nodes of the network is faulty (e.g., becomes inoperable or at least partially inoperable such that communications from, to, or relayed by that node cannot be transmitted, received, and/or relayed), it may prevent some messages in the network from reaching their intended destination nodes, thereby causing inconvenience (or worse) for users of the network. Many networks are able to automatically reroute messages around a faulty node once the failure is detected. However, even in such cases, the faulty node is causing the network to have reduced traffic capacity. Also, it may be impossible to route data around a faulty node if that faulty node is either the source node or the destination node of a data packet. Therefore, it is typically desirable to identify and repair a faulty node as quickly as possible.

In most networks, different messages, or even individual portions (e.g., packets) of each message, may travel between the same source device and destination device via different paths through the mesh network (different intermediate relay nodes, or even different source and destination nodes if the source or destination device is coupled to the network through multiple nodes).

A modern large scale network could easily comprise thousands or tens of thousands of nodes and typically comprises a plurality of smaller, heterogeneous topologies. The Internet currently comprises over one million nodes, for example. And, of course, the Internet is connected to countless other networks, each potentially comprising tens of thousands of additional nodes, thus forming a massive heterogenous network of millions of nodes.

Thus, when a message is not received properly at the destination node, it often an extremely difficult task to determine which node in the network is faulty and needs attention.

In order to identify a faulty node, operations teams employed by the network operator must examine the network topology and spot any inconsistencies along the paths from the source device to the destination device, and thereby determine which parts of the network need to be triaged in depth. To further complicate matters, often, network issues are reported hours after the problem was experienced and, often, are not replicable.

SUMMARY

In an embodiment, a computer-readable device comprises non-transitory instructions, which, when executed by a processor, cause the processor to perform the operations of: receiving a query identifying a source device in a communication network, a destination device in the communication network, and a time of interest; accessing a snapshot of a state of the network at a time preceding the time of interest, the snapshot comprising a topology of the communication network and a Routing Information Base (RIB) of the communication network at the time preceding the time of interest; accessing a set of network updates, the set of network updates comprising all updates to the topology and RIB of the communication network that occurred between the snapshot of the state of the network preceding the time of interest and the time of interest; generating, based on the snapshot of the communication network at the time preceding the start time and the set of updates, a RIB and a topology of the communication network at the time of interest; and determining, based on the generated RIB and topology of the communication network at the time of interest, at least one path through the communication network that a data packet intended for transmission from the source device to the destination device would have traversed at the time of interest.

In another embodiment, a method of determining a path that a data packet would have taken through a communication network at a time of interest comprises: receiving a query identifying a source device in a communication network, a destination device in the communication network, and a time of interest; accessing a snapshot of a state of the network preceding the start time, the snapshot comprising a topology of the communication network and a Routing Information Base (RIB) of the communication network at a time preceding the time of interest; accessing a set of network updates, the set of network updates comprising all updates to the topology and RIB of the communication network that occurred between the snapshot of the state of the network preceding the time of interest and the time of interest; generating, based on the snapshot of the communication network at the time preceding the start time and the first set of updates, a RIB and a topology of the communication network at the time of interest; and determining, based on the generated RIB and topology of the communication network at the time of interest, at least one path through the communication network that a data packet intended for transmission from the source device to the destination device would have traversed at the time of interest.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements.

FIG. 4 shows one user interface that may be generated by the system in response to a query for a path trace that a data packet transmitted from a particular source device or node to a particular destination device/node during a particular time window would have taken through the network in accordance with embodiments;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obfuscate the following description. Further, embodiments and examples not specifically described herein may be practiced in lieu of, or in combination with, the embodiments and other examples described, disclosed, or otherwise provided explicitly, implicitly, and/or inherently (collectively "provided") herein.

Identifying the location of a faulty node in a communication network that is causing a problem with the orderly transfer of data within the network can be an enormously time consuming task, especially when the problem is reported or looked into hours or more after the problem occurred. As previously noted, when two computing devices exchange data over a network, the data is usually transported in discrete packets, wherein each packet travels along a path from the source node to the destination node via one or more intermediate nodes (hereinafter relay nodes). In a mesh network, a routing table is developed over a period of time that dictates how any given packet will be routed through the network from any given source node to any given destination node. More particularly, the nodes of the network exchange control plane messages (layer 1, 2, and/or 3 messages, such as prefix advertisement and discovery messages, etc.) whereby the nodes, over time, determine the complete topology of the network, including, for instance, which nodes are directly couple to which other nodes and the cost of each connection between adjacent nodes. Some well-known protocols for advertisement and discovery of network topology data are OSPF (Open Shortest Path First) protocol, ISIS (Intermediate System to Intermediate System) protocol, and BGP (Border Gateway Protocol). The vast majority of all current networks use one or more of these three protocols. Typically, each node first exchanges messages to determine to which it is directly coupled (i.e., via one hop). Then the various nodes of the network exchange that information with additional nodes until every node in the network has a complete picture of the topology of the network.

Figure 1:
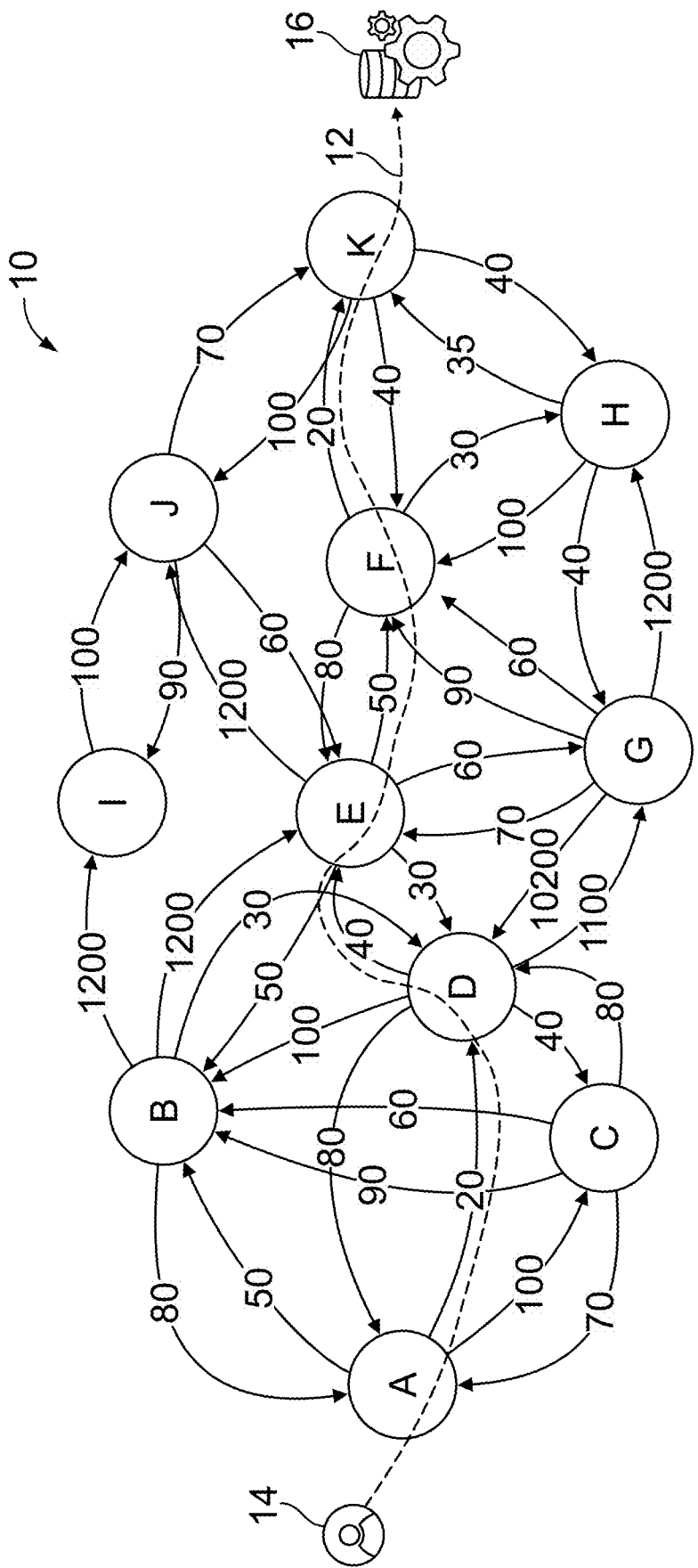
FIG. 1 is a diagram illustrating an exemplary network topology and packet routing through the network.

FIG. 1 shows a graphical representation of an exemplary network topology 10. It shows every node in the network as well as the links between the nodes and the cost of each link. In this simple example there are 11 nodes, namely, nodes A through K. Each arrowed line represents a direct communication link between two nodes (i.e., two nodes that can communicate directly with one another without using an intermediate node, sometimes referred to as adjacent nodes). The arrows indicate the directions of the links, and the number in the middle of each line represents the relative cost of the link.

Once the network topology is mapped and known by each node, each node can build a routing information base (often referred to by the acronym RIB or simply referred to as a routing table) which dictates to which other network node the node should transmit a data packet that is either generated at the node (e.g., at one of the devices coupled to the node) or received from another node for relay to yet another node. Particularly, each data packet typically includes within the packet the identity of the destination node and/or device of the packet. The node determines the next hop for the packet (i.e., the next node to which it should transmit the packet) based on the RIB and the destination node. The RIB is largely based on the network topology (including the interconnectivity of the network nodes and the cost associated with each hop). Various algorithms are known for building routing tables. One such algorithm is Dijkstra's Shortest-Path-First algorithm, for instance. This particular algorithm attempts to determine the best route through the network from a given source node to a given destination node based primarily on a combination of the shortest path from the source to the destination and the lowest cost. In addition to the network topology, the exact route that a packet takes through the network may also be dependent upon the content of the packet. For instance, video data may be sent along a different path than a short message or high priority data may travel along a different path than lower priority data. Thus, in some cases, the RIB may identify more than one potential path that the data may take through the network and the ultimate path will be determined by information external of the RIB (e.g., the type of the data or the hardware configuration of the relevant router).

As new nodes are added or old nodes are removed from the network, update messages are exchanged so that all of the nodes can continuously update their picture of the network topology and their respective routing tables.

Figure 2:
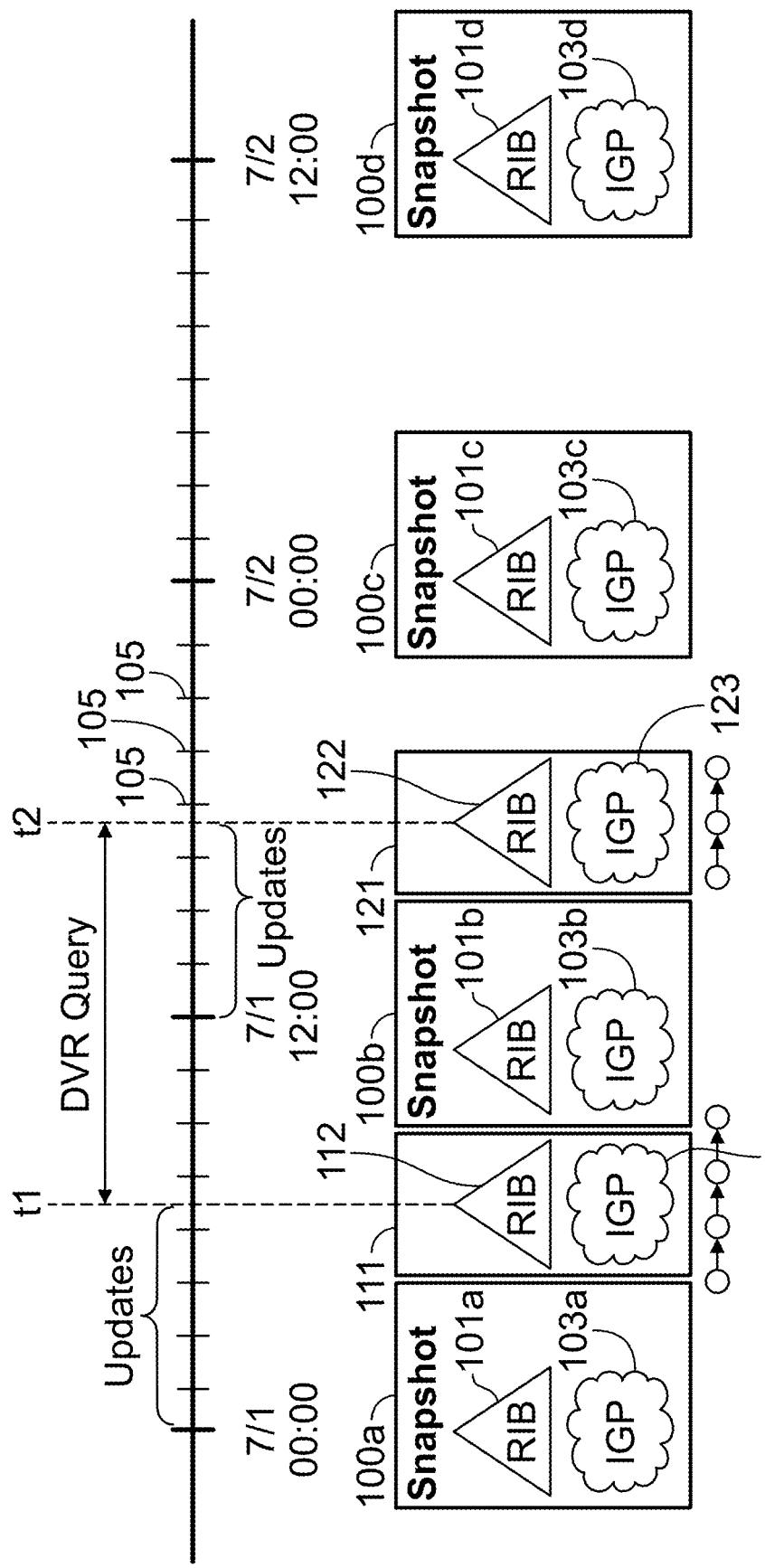
FIG. 2 is a timing diagram graphically illustrating various aspects of building snapshots of the state of the network at any given time in accordance with embodiments.

Referring again to the network topology diagram of FIG. 2, it also demonstrates a route, represented by the dashed line 12 dictated by the RIB for data originating at a first, source device 14 (e.g., a cellular telephone) that connects to the network via network node A and a second, destination device 16 (e.g., a server) that is connected to the network via node K. As can be seen, using an algorithm such as the aforementioned Dijkstras algorithm, the RIB dictates a path that goes from node A to node D, then from node D to node E, then from node E to node F, and, finally, from node F to node K.

In a common exemplary scenario, a user of the network may attempt to send data (an email, a text message, a video, an html request message, a photograph, a word processing document, etc.) from a device (e.g., a home computer) that is coupled to one node of the network (hereinafter the source node) through the network (e.g., the Internet) to a server device coupled to another node of the network (hereinafter the destination node). Let's say that the message comprised a request for a webpage. If a node that the request passes through or a node that the response thereto passes through is faulty, the user may not receive the requested webpage. That faulty node could have been somewhere in the route of the request message from the user's node to the server's node or in the route of the responding message from the server to the user. Commonly, the user would not be able to determine which. Also, the route that the request message takes from the user to the server could be different from the route of any response from the server to the user. Typically, all the user knows is that he/she did not get the requested webpage.

The incident (i.e., the failure of the user to receive the requested webpage) may not be reported to (or independently discovered by) the network operation for hours, days or even longer. During that delay, the network topology and the routing tables likely have changed many times (e.g., due to nodes being added to or removed from the network or nodes becoming faulty). When the problem is reported (or discovered), the network operator typically will wish to determine which node caused the problem and the cause of the problem, and take appropriate action to prevent the problem from occurring again (e.g., fix, replace, or route traffic around the faulty node). Typically, this task would be assigned to a network analyst who would first determine the path through the network that the failed data packet (or response packet thereto) took through the network in order to minimize the number of nodes that need to be triaged (i.e., typically the problem would be in one of the nodes that the packet traversed).

Commonly, when such an error is reported or discovered, the network analyst will know little or nothing more than the source node and/or device, the destination node and/or device, and, hopefully, the approximate time that the fault occurred. It should be apparent from the discussion above that the task of determining the nodes of the network that the failed message(s) passed through between a given source node and given destination node (not to mention the reverse path, since the fault could have occurred in the path of the response message rather than the path of the request message) in a given time period involves the analysis of a staggering amount of data and, thus, can be extremely time-consuming.

In an embodiment, a computer-implemented method efficiently stores data from which a detailed picture of the topology, status, and routing tables in the network at any given past time can be recreated quickly, accurately, and efficiently. In an embodiment, a network analyst can enter the network address (e.g., an IP (Internet Protocol) address) of a source node (or even a particular device coupled to the network through a network node), the network address of a destination node, and a time frame (as small as one second or less) into the system and the system will generate a report of the route(s) that a packet would have taken through the network between those two nodes at that time frame. Further, the system allows quickly linking from a first user interface showing the aforementioned route information to another, single window user interface with various widgets showing detailed data about each node in the route, including, for instance: network status of upstream and downstream interfaces along the path; syslogs, events and alarms from devices along the path; IGP updates from the path elements and the entire network; and prefix updates for the matching route prefix.

As will be described in more detail below, the report can be generated in a matter of seconds, rather than minutes, due to the memory efficient manner in which network state data is stored and the computationally efficient way that the state of the network at any given moment is re-created from that data. In addition, from that report, the analyst can quickly and efficiently drill down into the aforementioned specific details of each node in the route(s).

More particularly, in an embodiment, the system obtains and stores a plurality of BGP files disclosing of the state of the network at certain instances in time (hereinafter sometimes referred to as snapshots). Such BGP files are well known in the related arts and comprise data that can be used to determine the topology of the network as well as the routing tables for the network at a given instant in time.

The interval between the snapshots may be fixed or may be variable. The intervals may be determined as a function of network operational parameters, such as traffic volume, number of nodes in the network, etc.

One BGP file for a large scale network, such as that of large commercial ISP could easily exceed 100 Gigabytes of data. Accordingly, a balance must be struck between the intervals, the period of time over which the system will maintain such files before deletion, and the memory needed to store those snapshots.

In one exemplary practical embodiment, the system obtains from the network operator a BGP file of the state of the network at intervals of 12 hours. The period of time over which the network status BGP files are stored before being deleted can be any period, but should be selected to assure that it exceeds the longest reasonable amount of time between the occurrence of a network fault and the resolution of that fault. As noted above, it could take days to report or detect a network fault. In addition, it could take several additional days to solve the fault. Accordingly, the period should be at least a few weeks, and ideally, at least six months.

From each BGP file, the system builds a snapshot of the state of the network at that instant. Each snapshot comprises the RIB for the entire network and the IGP topology of the network at that instant in time.

In addition, the system obtains and stores records of the updates to the routing and other protocols, such as OSPF, ISIS, and BGP, at smaller intervals between the BGP file snapshots. Again, these intervals can be of any duration, can be fixed or variable, and/or can be a function of network conditions. For purposes of example, in one embodiment, the interval between obtaining such reports may be fixed and may be every ten minutes.

Unlike the BGP files from which the snapshots of the network state are built, these update files do not comprise information as to the state of the network at any given instant in time, but rather comprise a list of events that occurred in the network (those events that can affect the topology and/or routing tables in the network, such as OSPF, ISIS, and BGP updates). These update reports also are well known in the related arts.

FIG. 2 is a timing diagram graphically illustrating various aspects of an exemplary embodiment of the system as described herein.

As can be seen, the system obtains a stores BGP files from the network operator that provide snapshots 100a, 100b, 100c, 100d of the state of the network at twelve hour intervals (e.g., July 1 at 00:00 (i.e., 12 AM), July 1 at 12:00 (12 PM), July 2 at 00:00, July 2 at 12:00, etc.). The data in each BGP may be considered to comprise two basic forms of data. The first form is the network RIB at that instant in time represented by the triangular icons 101a, 101b, 101c, 101d in the diagram. The second form is the IGP profile, which is a picture of the topology of the network at that instant in time, represented by the cloud icons 103a, 103b, 103c, 103d in the diagram.

In addition, at multiple intervals between each 12 hour snapshot of the network, the system obtains a record 105 of all of the routing protocol updates that occurred between the current update and the immediately preceding update (or the snapshot 100 of the network state in the case of the first update file after a snapshot). In order to keep FIG. 2 from becoming too busy, the updates are represented by vertical lines 105, and only some of those updates are labelled with the reference number (105). Furthermore, only seven updates are shown between each snapshot (which would translate into an update about every 103 minutes). However, in a preferred embodiment, the intervals would likely be much smaller, perhaps on the order of about every 10 or 20 minutes. As will become clear from the discussion below, the smaller the intervals between update reports, the shorter the period of time before the current time that is unavailable to the network analyst to examine. Particularly, the system cannot build a snapshot of the status of the network at any instant in time that is subsequent to the last update report 105 received and stored (or the last snapshot 100, in the case of the interval between a snapshot and the first update report after the snapshot). Thus, in a worst-case scenario, if a network analyst wanted to ascertain the status of the network at one second after the last update arrived, he/she would have to wait almost the entire interval between updates (the interval minus one second) before being able to do so.

Thus, for example, if the intervals between updates was 3 hours, and a network analyst wanted to obtain a view of the network at an instant in time 15 minutes before the current time, the network analyst would have to wait 2 hours and 45 minutes, i.e., until the next update arrives to do so.

Typically, a network analyst analysing a network event will know the source node/device, the destination node/device, a time or a time window in which the event occurred, and the nature of the event (e.g., the source device failed to receive an expected response from the destination device). In order to triage the event (e.g., to determine the location and nature of a fault in the network that caused the event to occur), the network analyst usually will start by determining the state of the network in the relevant time window.

In accordance with the principles, systems, methods, and apparatus disclosed herein, the network analyst can input a query to the system comprising the identities of the two nodes and/or devices between which the event occurred and the time window of interest (hereinafter sometimes referred to as the event time window or event window) into the system. The analyst might enter a specific start time and end time of the window or may specify that the event window should be the last hour, week, month, quarter, etc.

Responsive to the query, the system will determine the path(s) that a data packet would have taken through the network between those two nodes during that event time window and generate a report including the path(s) and detailed information about each node in the path(s) within the given event window. The system will build on the fly, a picture of the network topology and recreate the RIB(s) at the beginning and at the end of that time window based on the relevant IGP files and update logs as described above, and will also implement route lookups that mimic the real network's operation at the beginning and end of the specified time window to determine the path that a data packet would have taken through the network from the source device/node to the destination device/node. Since, it is possible that the network topology and RIBs could have been updated at some point in the middle of the event window, the network analyst may zoom in on a smaller time window (as small as one second) as he/she deems advisable.

More particularly, the system retrieves from memory the most recent snapshot 100 prior to the start time of the event time window as a base starting point. It also retrieves from memory all updates between the time of the selected snapshot and the event window start time by reading all updates reports 105 between the stored immediately preceding snapshot 100 and the update report immediately subsequent to the event window start time. It then builds another snapshot of the state of the network at the event window start time based on the stored immediately preceding snapshot and the updates between that snapshot and the event window start time.

Then, the system builds another snapshot of the state of the network at the event window end time in a similar manner as described above for the event window start time snapshot. Particularly, the system retrieves the most recent network snapshot 100 prior to the event window end time. This may be the same snapshot used to build the event window start time snapshot or it may be a different one if a network snapshot 100 was stored between the start time and end time of the relevant event time window. The system then retrieves all updates between the time of the selected snapshot and the event window end time by reading all the updates reports 105 between the stored immediately preceding snapshot 100 up to the update report 105 immediately subsequent to the event window end time and builds a new snapshot of the state of the network at the end time of the event window.

The system will then take the two nodes between which the network event occurred and generate a report the forward and reverse paths that a packet would have travelled between the two nodes at the event window start time and the event window end time and provide user interfaces that allow the network analyst to easily drill down into detailed information about each node in those paths.

As described in more detail below, the system generates a report that includes an ordered list of the nodes that a data packet would have travelled through between the two nodes during the event window, including detailed information as to the status of each such node based on the determined topology of the network and the determined RIB. If there were changes (or the possibility of changes) to the network topology and/or the RIB within the event time window that would have altered the path between the two nodes within the event time window, the analyst can simply reset the event window to a smaller interval within the originally selected event time window, and the system will repeat the process for the smaller time window.

Referring again to FIG. 2, it demonstrates various aspects of the above-described operation. As shown, the event window entered by the network analyst is the 24 hours between time t1 and time t2. As can be seen, time t1 is approximately 6 AM on July 1, and time t2 is approximately 6 AM on July 2. In order to determine the state of the network at time t1, the system retrieves the BGP file that was the most recent snapshot preceding the event window start time t1, namely, snapshot 100a at 12 AM on July 1. It then builds a RIB 101a for the snapshot time and an interconnected topology 103a by combining any OSPF, ISIS, and BGP data for the snapshot time.

The system also retrieves all of the update reports 105 since the time of snapshot 100a up to and including the first update report after time t1. Specifically, as previously mentioned, each update report 105 includes all of the network updates that occurred since the last update report. They are not snapshots, but rather lists of the changes that occurred in the network and the times that they occurred. Thus, the system should retrieve all update reports up to the update report immediately after time t1, i.e., because that report may contain network updates that occurred between the network update report immediately preceding time t1 and time t1, which are necessary to determine the state of the network at time t1.

Then, it applies all updates (e.g., IGP updates) that occurred between the snapshot 100a and time t1 and builds a new RIB 112 for time t1 by applying all prefix advertisements and withdrawals dynamically to the RIB 101a. Furthermore, it determines the egress-nexthop for the destination node, e.g., using longest-prefix match on the new RIB at time t1.

Next, from the time of snapshot 101a to time t1, the system retrieves all the IGP updates from the relevant update reports 105 and builds a new topology 113 at time t1 by dynamically applying all of those updates to the IGP topology 103a of snapshot 100a. Then, the system determines the path that a data packet could have traversed through the network between the two nodes at time t1 by, e.g., applying Dijkstra's shortest-path-first algorithm to determine the shortest path from the source device/node to the egress-nexthop using the RIB 112.

Essentially the same process is performed to determine the state of the network at the event window end time, t2, including a RIB 122 and an IGP topology 123. Specifically, since, in this example, another network snapshot was stored between the start time of the event window, t1, and the end time of the event window, t2, the system retrieves snapshot 100b (including the RIB 101b and the IGP/topology 103b) that was the most recent snapshot preceding event window end time t2. The system also retrieves all of the update reports 105 since snapshot 100b up to and including the first update report after event window end time t2. It then applies all updates that occurred between the snapshot 100b and time t2 and builds a new snapshot 121 of the network state at time t2, including a new RIB 122 and a new topology 123.

If, on the other hand, a network snapshot 100 had not been stored between time t1 and time t2, then the snapshot 122 at time t2 would have been built starting with the same snapshot, i.e., snapshot 100a, that was used to build the snapshot 111 at time t1, but just applying additional updates not included in the building of snapshot 111.

As previously noted, sometimes, the generated network topology and routing table may reveal that more than one potential path was possible at a given instant. If more than one potential path is available via different peers, the system will return all possible paths to the analyst, and may use BGP best path selection algorithm to indicate the best path and present the best path in the report along with the alternate paths, the tie-breaker factor between the potential paths, and BGP attributes. This would be useful to the network analyst because the analyst could than choose to examine the most likely path first.

In addition to the forward path, the system may also indicate asymmetry in the network (i.e., if the reverse path from destination to source is not exactly a mirror of the forward path) and include information about the reverse path(s) in the report.

The system described herein is efficient in that the data needed to build the snapshots of the network in any given time window is stored locally and is immediately available, such that the snapshots can be built within seconds of receiving the inquiry. Furthermore, the use of snapshots at well-spaced intervals combined with update reports at smaller intervals between the snapshots minimizes the amount of memory needed to store the massive amount of data needed to build the snapshots at the event window start and end times.

Furthermore, storing the update data at relatively small intervals allows almost immediate access to recent network data. That is, if the interval between the instances of retrieving/storing the update data is, e.g., ten minutes, then network state data as recently as no more than ten minutes ago will always be available to an analyst.

Additionally or alternately, updates may be obtained at variable intervals. Additionally or alternately, updates may be obtained upon demand, thus allowing reporting of network status virtually up to the second without any period during which data is not yet available. In fact, in some embodiments, in order to reduce storage memory requirements and well as provide virtually contemporaneous network status reporting, the update data may not be obtained and stored at all except responsive to a query, e.g., retrieve, only responsive to a query, only the updates between the last BGP file stored before the start time of the query and the actual start of the query time (plus the same data for the end time of the query).

This type of on-demand embodiment would certainly significantly cut down storage capacity requirements and allow access to very recent network data. On the other hand, in an on-demand embodiment, it will still take a significant amount of time from entering a query for the system to contact the network operator to request the updates, the network operator to retrieve the update information, package it, transmit it to the system, the system to process and store it, etc. Thus, this on-demand type of embodiment might not actually provide much more recent data than the former embodiment.

Second and even more significantly, an important advantage of the former embodiment (with regular storing of updates) is that it operates essentially entirely independently of the network, and therefore does not disturb the normal functioning of the network. Particularly, in embodiments with regular reporting of updates, all of the data used by the system is already normally retained offline by the network operator regardless of deployment of the described system and can be easily provided to the system without any disturbance of the network operation and minimal inconvenience to the network operator. That is, an analyst that is triaging the network using this system does not interact with the actual network at all. It does not add any traffic to the network or otherwise interfere with the normal operation of the network. The on-demand type embodiment may require at least some interaction with the network to retrieve updates on demand, which may not be acceptable or desirable for the network operator.

In a practical usage of the system, an analyst may start with a query specifying a relatively large time window in order to identify some of the more significant factors that may have affected the network within that time window and then, based on that review, enter a new, smaller time window to analyse the network at a more granular level. In other circumstances, it may make sense for a network analyst to start with a relatively smaller time window, and, subsequently, expand the time window.

In yet other scenarios, after an initial inquiry, the network analyst may determine that he/she wishes to look at a completely different time window. All such cases are readily accommodated within the system.

In certain embodiments, in response to a query, the system first provides the analyst with a user interface showing an ordered lists of nodes representing the path that a packet would have taken through the network from the source node to the destination node at the event window start time, t1, and the event window end time, t2.

In those cases where the available data indicates that there is more than one possible path that a packet may have taken, the system will show every possible path that a packet could have taken. In embodiments, the system may include information as to which type(s) of data would have taken each particular path, which could be quite helpful to the analyst if he/she does know the type of the data that was involved in the network incident of interest based on the incident report or other data sources.

If the system can determine a best path out of several potential paths as previously discussed, the report may indicate the best path, such as by highlighting the most likely path in the list of potential paths or listing the potential paths in the order of likelihood. In an example, the determination of likelihood may be based on any criteria. For instance, if more than one best path is available via different peers, a BGP best path selection algorithm may be used to determine the best path and the system may present the best path along with the alternate paths, the tiebreaker, and BGP attributes. In another embodiment, if the particular path that would have been taken by a packet is a function of the type of data in the packet, then the potential paths may be listed in order as a function of the most commonly found data type in the network (or in networks in general) down to the least commonly found data type in the network (or networks in general).

In embodiments, the user interface is designed to be intuitive and user friendly. In one embodiment, the user interfaces are designed to cause the experience of using the system to at least partially mimic the use of a Digital Video Recorder (DVR), a device with which most people are familiar.

Figure 3:
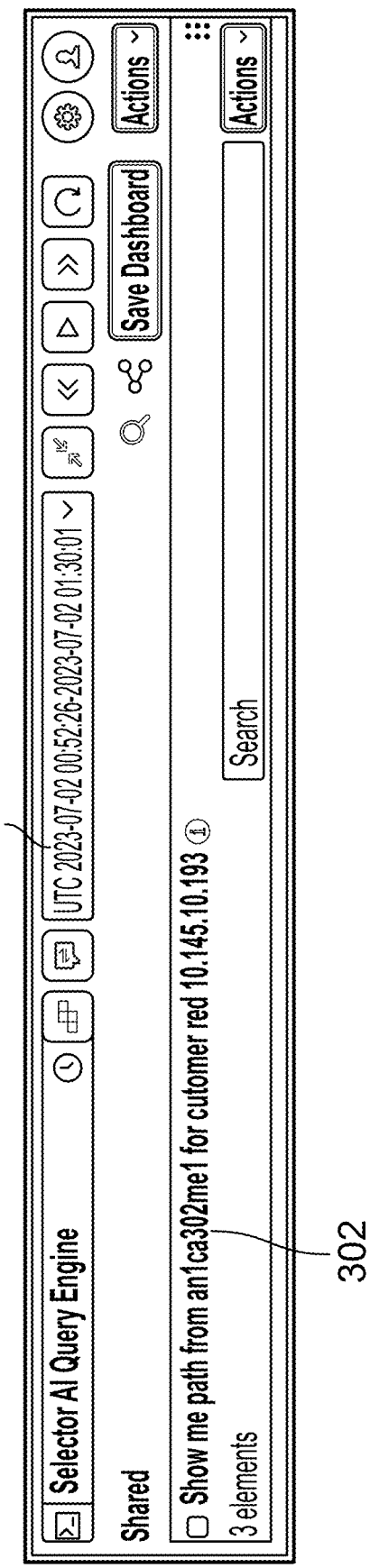
FIG. 3 is shows a user interface for a user to enter a query into the system in accordance with embodiments.

FIG. 3 shows an exemplary user interface for a user to enter a query into the system in accordance with one embodiment. As noted above, a query comprises at least (1) a source node, (2) a destination node, (3) a start time of the event window, and (4) an end time of the event window. In an embodiment, as shown at 301, the user may be presented with a data entry box in which he/she may enter start and end times for an event window to a resolution of one second. In another window, as shown at 302, the network analyst may be presented with another data entry box in which he/she may enter a query identifying the source and destination nodes/devices of interest. In this example, the analyst has asked to see the path from router an1ca302me1 to router 10.145.10.193 for a particular customer identified as customer "red"

Figure 4:
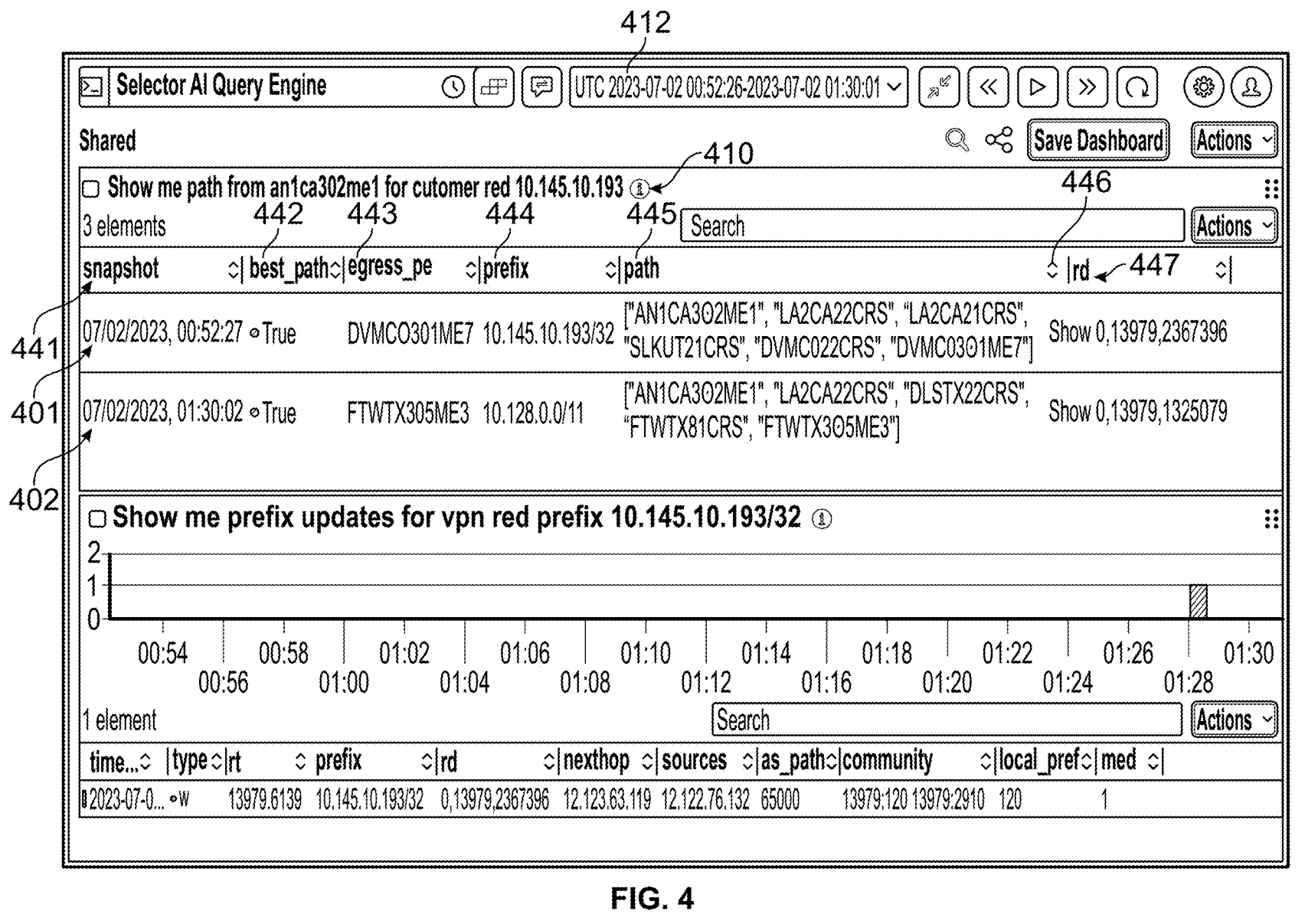

FIG. 4 shows an example of an initial user interface that may be generated by the system in response to the query that presents to the user a list of paths that a data packet transmitted from the entered source node to the entered destination node would have taken through the network during the event time window. As can be seen at 410, the user has asked to see the path trace between a customer device with a VPN ID of an1ca302me1 (the source device) and a network node having the IP address 10.145.10.193 (the destination node). As can be seen at 412, the user has specified an event window from 2023 Jul. 2 00.52.26 (Jul. 2, 2023 at PM and 39 seconds) to 2023 Jul. 2 01:30:01. In this example, one path was applicable at the start time of the event time window (7/2/23 @12:52:27 AM), namely, the path shown in the first row 401. Then, at the endoOf the event window (Jul. 2, 2023 at 1:31:02 AM, there were two possible paths according to the RIB, namely, the path shown in the second row 402 or the path shown in the third row.

Figure 5:
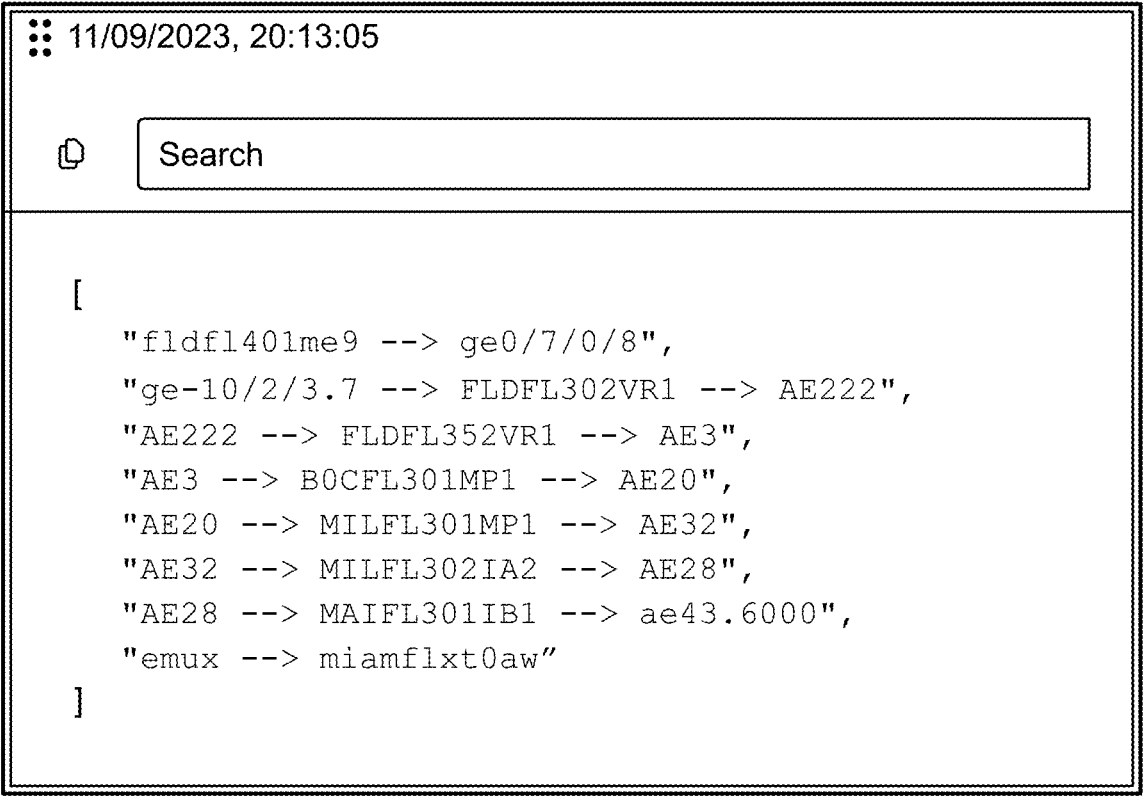
FIG. 5 is a diagram illustrating a drop down display that the system may generate in response to a request to drill down into data displayed in the user interface of FIG. 4 in accordance with embodiments.

As can be seen, each row comprises multiple columns populated with relevant data about the path. The first (leftmost) column 441, labelled "snapshot", is populated with the aforementioned time that the corresponding path was applicable (either the event window start time or the event window end time, as the case may be). The second column 442, labelled "best path", is a TRUE/FALSE column which indicates whether the corresponding path was deemed the best path (e.g., according to the RIB and/or a BGP best path selection algorithm). The third column 443, labelled "egress_pe", contains the egress_PE of the destination node. It also is a clickable link that, when clicked on, will open another window containing more detailed information about the corresponding path (as will be shown and discussed in more detail below in connection with FIGS. 6-9). A fourth column 444, labelled "prefix", is populated with the IP address (or prefix) of the destination node of the path. A fifth column 445, labelled "path", is populated with an ordered list of the network nodes in the path from the source device to the destination node. A sixth column 446 is populated with a hyperlink (represented by the word "Show" that, when clicked on, will generate a drop down menu such as shown in FIG. 5, revealing more detailed information about the corresponding path, namely, not only the network nodes in the path (which is already seen in the data in the path column), but also the ingress port and the egress port of each such node that the data packet passed through. Any number of additional columns, such as the "rd" 447 column, may be provided for viewing in this view. Any of the typical pieces of information that a network analyst attempting to triage a network fault might want to look at is available from the snapshots and updates and can be displayed in this user interface (and/or in separate drill down user interfaces, such as the single pane user interface of FIGS. 5-9 to be discussed in more detail below). The "rd" column 447, for instance, is a column that discloses which peer node advertised this route.

In this example, it can be seen that, at the event window start time, the path shown in row 401 comprising six nodes was applicable. However, at the event window end time, there was a different path according to the RIB, namely, the path shown in row 402 comprised five nodes, including the same first and second nodes as in the first path of row 401, but three different nodes toward the end of the path. It can also be seen from the "best path" column 442 that this path in row 402 was deemed the best path at that time.

In an embodiment, by clicking on any path in FIG. 4, the user interface takes the user to a dynamically generated dashboard with several widgets showing further details of the path, such as: (a) network status of upstream and downstream interfaces along the path; (b) syslogs, events and alarms from devices along the path; (c) IGP updates from the path elements and the entire network; and (d) prefix updates for the matching route prefix.

Figure 6:
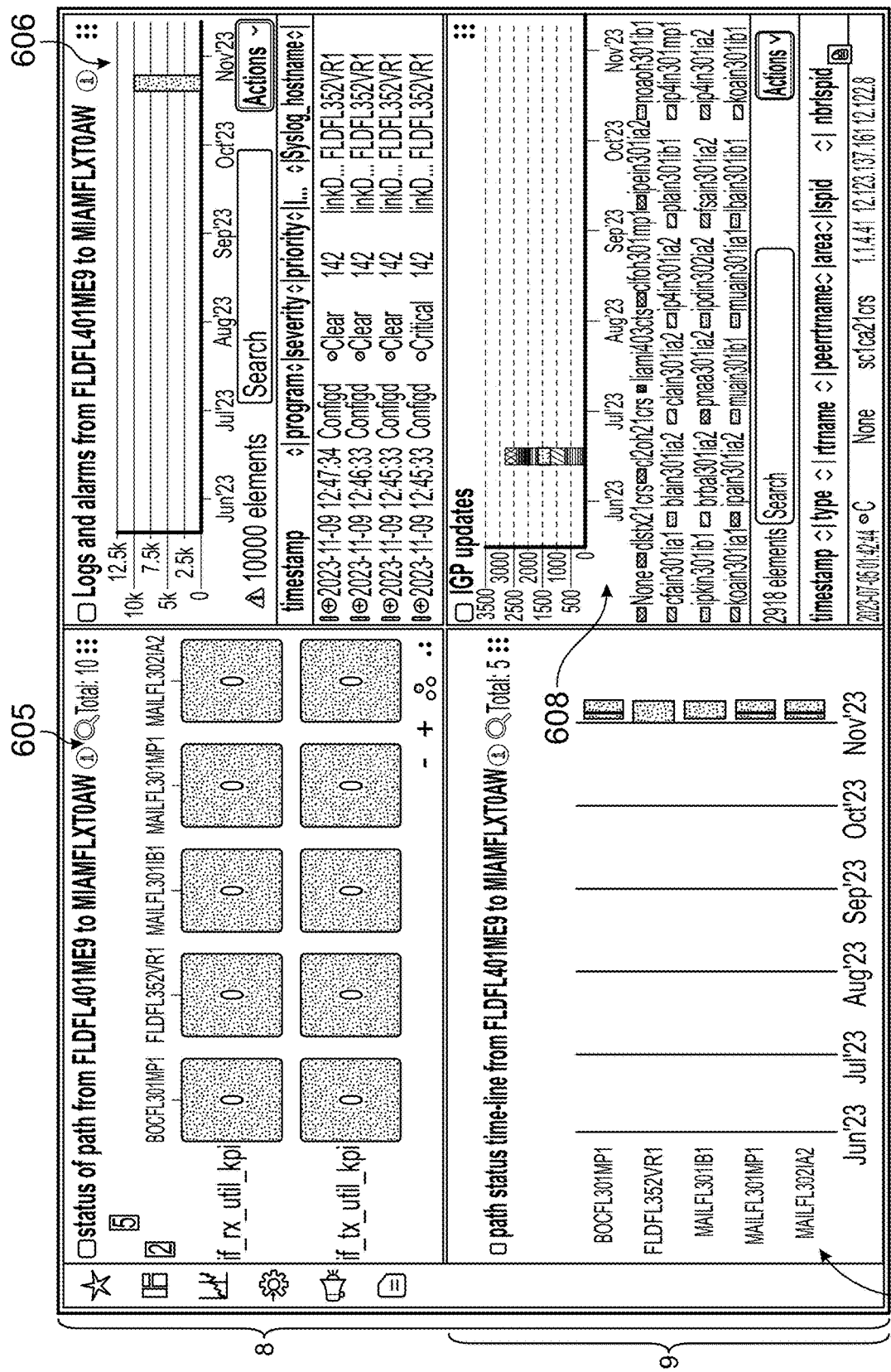
FIG. 6 is a diagram illustrating a user interface that the system may generate when a user selects to see more detailed information about a path seen in FIG. 4 in accordance with embodiments.
Figure 7:
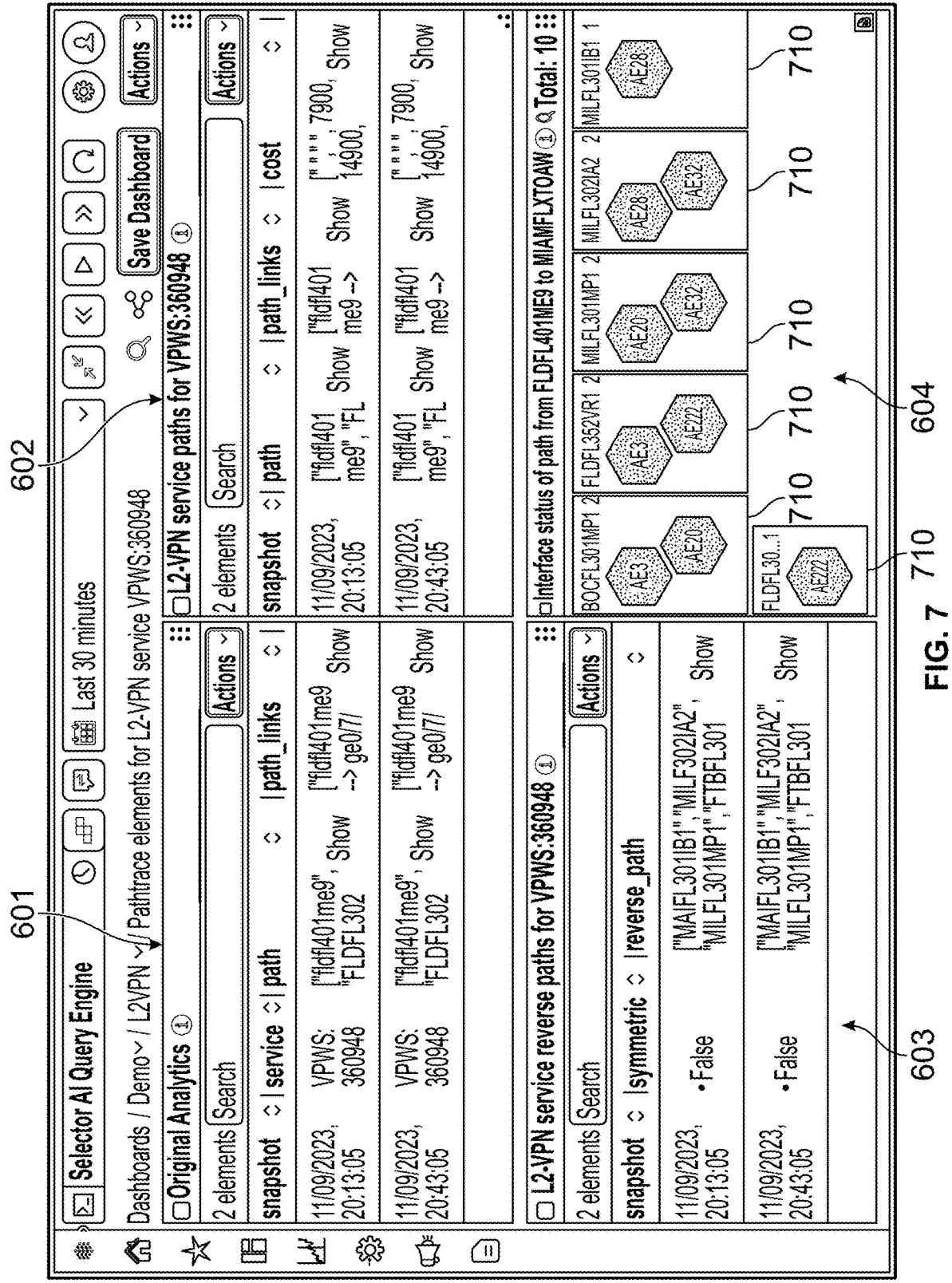
FIG. 7 is a close up view of a first portion of FIG. 6.
Figure 8:
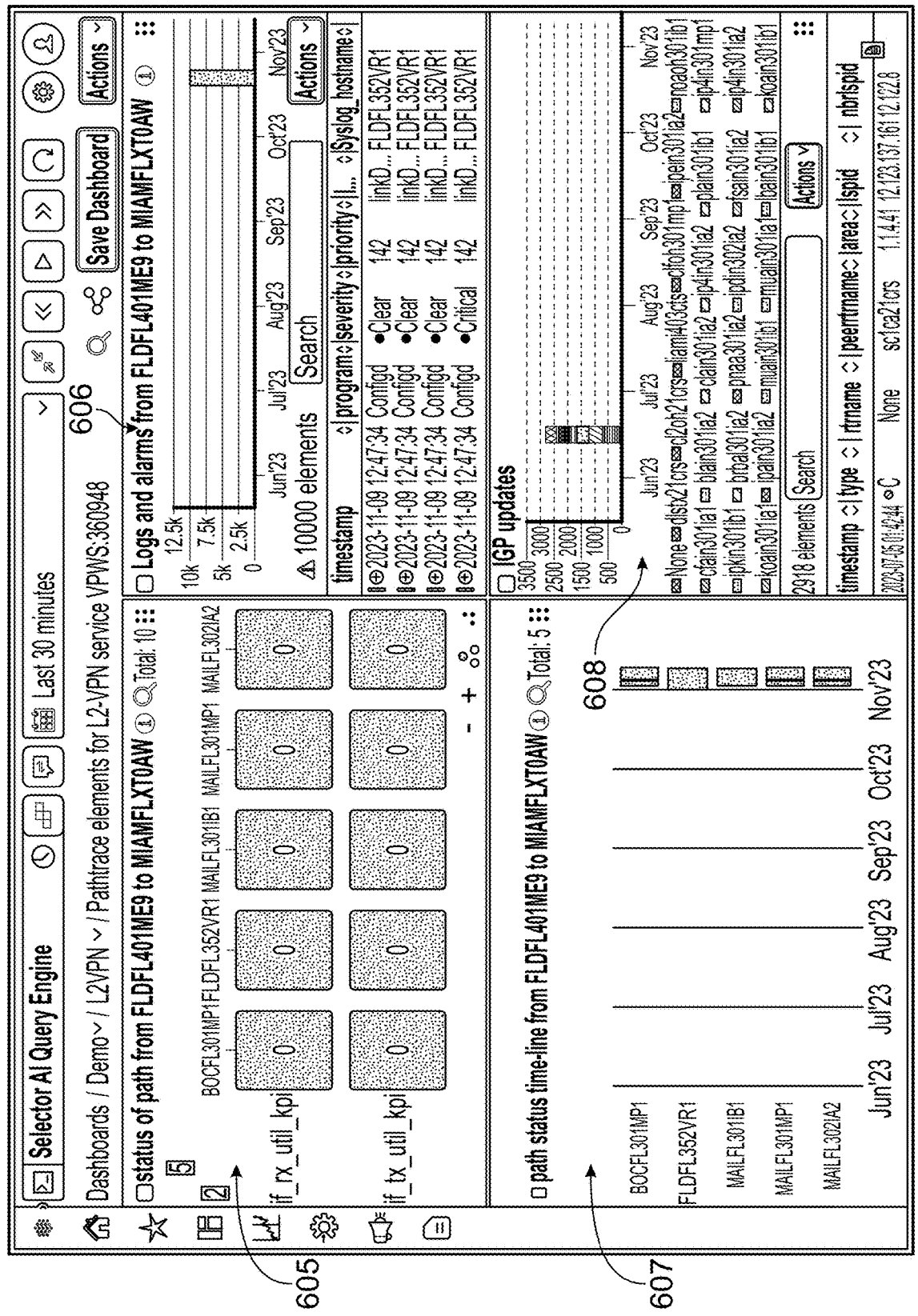
FIG. 8 is a close up view of a second portion of FIG. 6.
Figure 9:
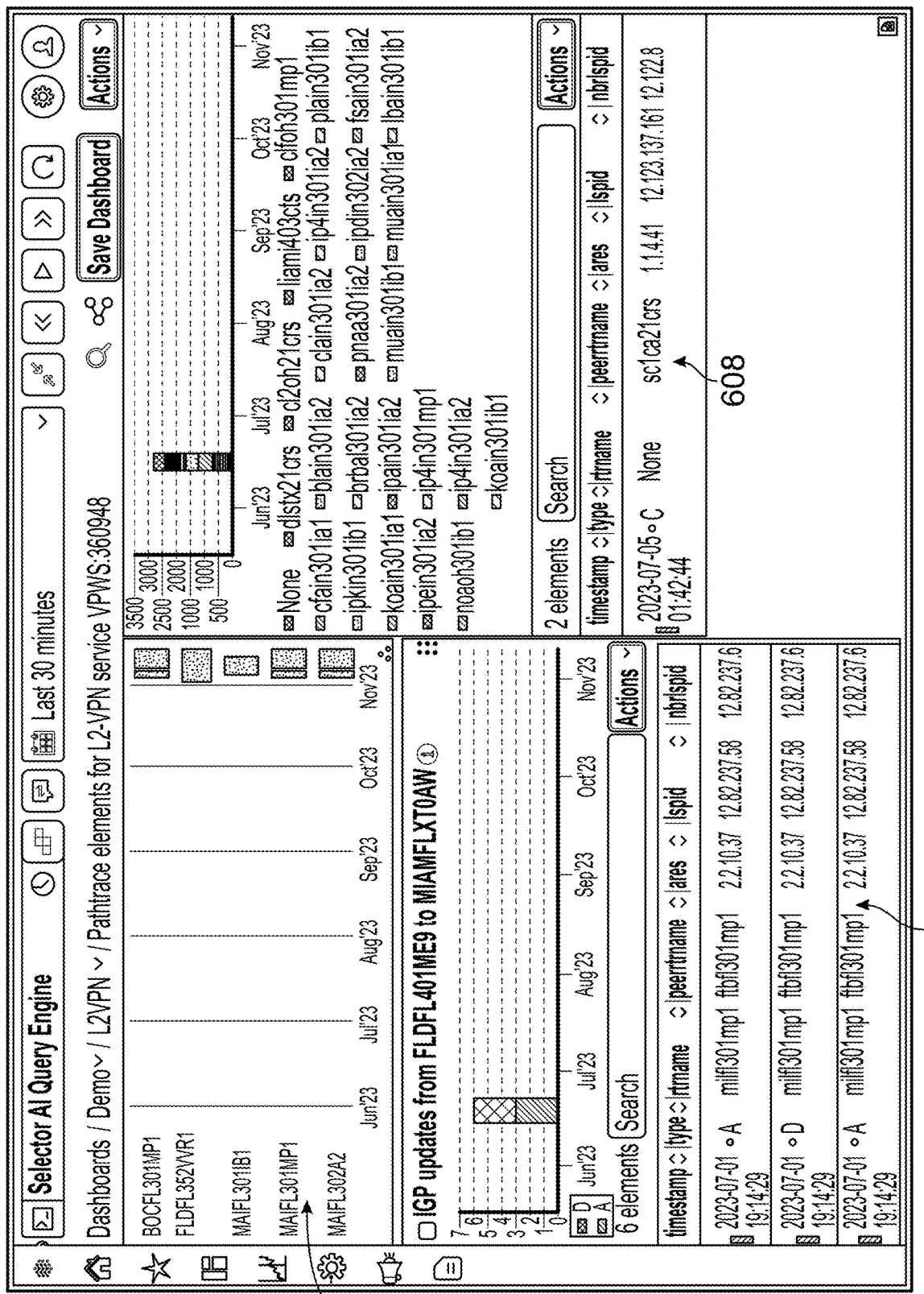
FIG. 9 is a close up view of a third portion of FIG. 6.

In one exemplary embodiment, clicking on the value in "egress-pe" column of any of the three rows in the user interface of FIG. 4 will open up another new user interface, such as shown in FIGS. 6 through 9, which presents the user with a plethora of relevant information about the corresponding path in a single window. FIG. 6 shows the single window in its entirety in accordance with one embodiment. Since the single pane of FIG. 6 contains so much information, FIGS. 7, 8, and 9 are provided to show the same content, but in three separate figures in which each portion of the window is enlarged for easier viewing. The brackets numbered 7, 8 and 9 in FIG. 6 show the portions of FIG. 6 that appear in FIGS. 7, 8, and 9, respectively. Note that there is some overlap between FIGS. 7, 8, and 9 to provide continuity.

The single window shown in FIG. 6 comprises nine different sections (or panes), each comprising a widget containing a collection of relevant information of a particular type about the corresponding path.

A first pane 601 (top left in FIG. 6 and again top left in FIG. 7) shows the path information similar to what was shown in the user interface of FIG. 4 in a similar row and column format. Particularly, it includes the same "snapshot", "path", "path links", and "up/down arrow" columns as in the user interface of FIG. 4. However, instead of the "best path" column in FIG. 4, pane 601 includes a "Service" column, which discloses a layer 2 end to end connection for this path. For instance, in this example, this column discloses that the end to end path is part of a virtual private wired service (VPWS). One or more additional columns may be provided in this widget or made viewable by further drilling down to even further detailed data in another user interface.

For sake of clarity, note that, each column is expandable/contractable to a selected column width. Accordingly, in some of the rows seen in FIGS. 6-9, some of the columns may not actively display the entire data for that column because the data takes up more width that the width to which the column is presently set. As is common in the computer user interface arts, all of the data for a given column can be viewed by expanding the column width as needed and/or scrolling left/right through the characters in the column.

The manner in which the data is displayed to the analyst can take many forms, and FIGS. 4-9 merely show one example for sake of illustration. More, less, or different data may be displayed in any given window or pane of a window. What is noteworthy is that virtually anything that a network analyst would want to know is available from the reconstructed snapshots (e.g., 112, 121).

In a second widget, seen in pane 602 (top right in both FIGS. 6 and 7), the analyst can ask to see a view of similar information as shown in pane 601, but for a specific service. In this case, the analyst has asked to see the information only for service path VPWS:360948

A third pane 603 (bottom left in FIGS. 6 and 7) shows similar information as shown in panes 601 and 602, but for the reverse path between the two selected nodes. As previously noted, the forward data path between two nodes is not necessarily symmetric with the reverse data path between the two nodes. In fact, pane 603 includes a TRUE/FALSE column labelled "symmetric" which indicates whether or not the reverse path is the same as the forward path between the two selected nodes.

A fourth pane 604 (bottom right in FIGS. 6 and 7) graphically shows the interface status of the path between the two nodes. Particularly, each block 710 in pane 604 corresponds to one of the nodes in the path, with the node ID being found in the top left corner of the block. Each block includes two hexagons, representing the relevant ingress port of that node and the relevant egress port of that node, respectively. The text within each hexagon is the ID of the corresponding port. The color of the hexagon represents the status of the port, wherein, in this embodiment, green means that the port was functioning properly and red means that the port was malfunctioning.

A fifth widget/pane 605 (upper middle left in FIG. 6 and top left in FIG. 8) focuses on information about packet loss. For instance, this widget shows the number of packets that were dropped at each port during the event time window. More particularly, each node is represented by two squares stacked vertically, wherein the upper square represents the relevant ingress port of that node, and the lower square represents the relevant egress port of that node. Above each pair of vertically stacked squares is the ID of the node. To the left of each row of squares is the label "if_rx_util_kpi" and "if_tx_util_kpi" indicating that the upper row shows such information for the input ports and the lower row shows such information for the egress ports. In the middle of each square is a number indicating the number of packets that were dropped in the event time window. The color of the square may be used to indicate whether the number of dropped packets is within certain parameters. For instance, green may indicate that the number of packets being dropped at the port is within expectations. Grey may indicate that the number of packets being dropped at the port is greater than normal expectations, but still within acceptable parameters, and thus may warrant further triage. Red may indicate that packets are being dropped at the port at an unacceptable level, such that further triage probably is required.

A sixth widget/pane 606 (upper middle right in FIG. 6 and top right in FIG. 8) focuses on the log and alarm data. It shows a list of the logs and alarms that occurred along the path during the event time window. Note that the view of FIGS. 6 and 8 displays only a few rows of the log, but there are additional rows corresponding to alarms that can be accessed by scrolling through the list within pane 606. For each alarm/row, each column provides relevant information, such as the time of the alarm, the program generating the alarm, the severity rating of the alarm, the priority of the alarm, etc.

A seventh pane 607 (lower middle left in FIG. 6 and lower left in FIG. 8) shows the path status time-line for the path.

An eighth pane 608 (lower middle right in FIG. 6 and lower right in FIG. 8) shows the IGP updates that occurred during the event time window.

A ninth pane 609 (lower left in both FIGS. 6 and 9) shows

FIGS. 4-9 are merely exemplary. In other embodiments, the various user interfaces may be arranged in different way, may display additional or fewer items of information than shown in these examples, and/or may present the data in different graphical formats. The primary point is that virtually anything that a network analyst would want to know is available from the reconstructed snapshots (e.g., 112, 121) and can be displayed upon request.

Figure 10:
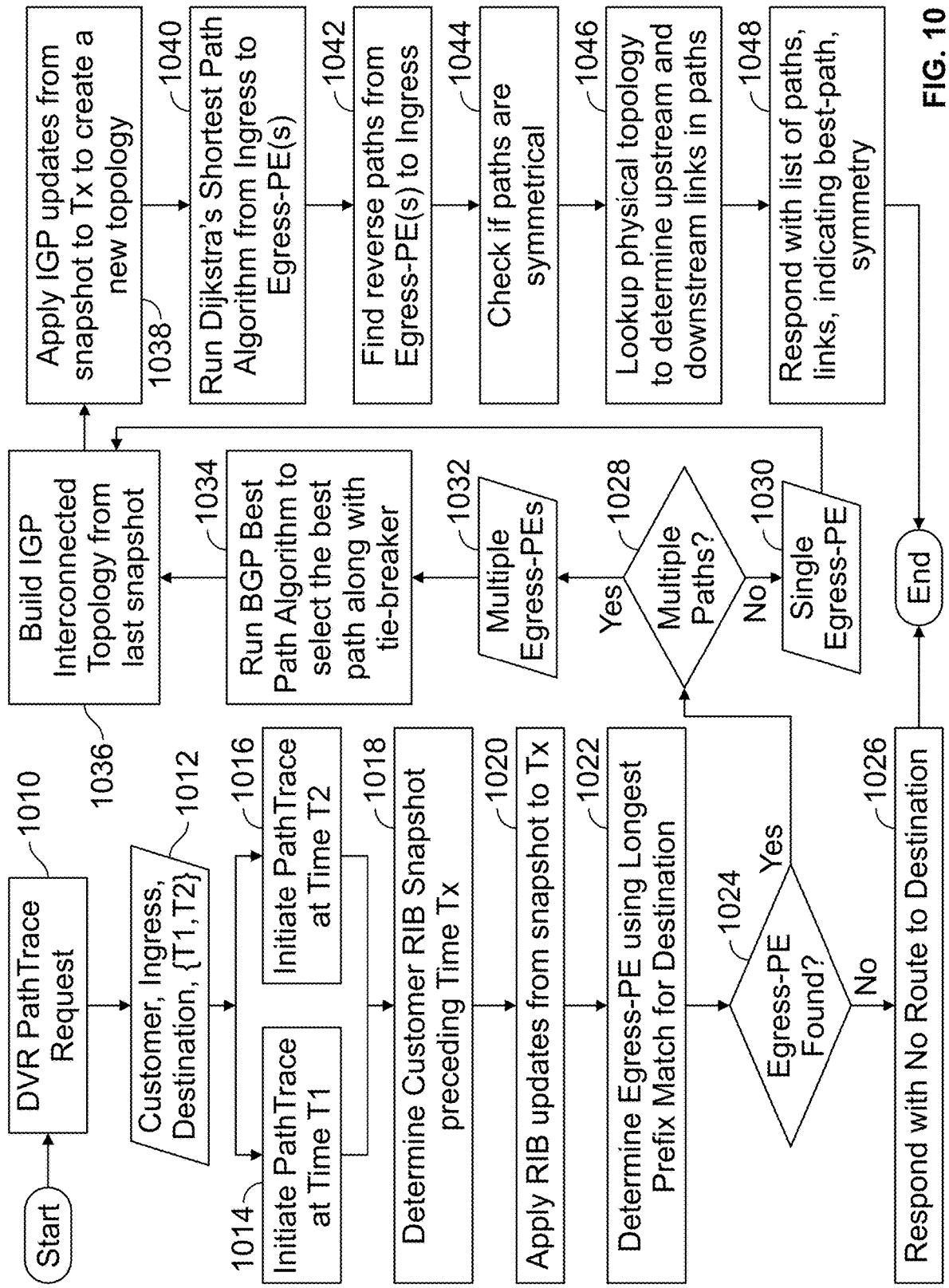
FIG. 10 is a flowchart illustrating operation in accordance with embodiments.

FIG. 10 is a flowchart showing operation of the system in response to a query from a network analyst/user as discussed hereinabove in accordance with an embodiment. This flowchart starts from the assumption that the IGP files 101 and updates 105 have been previously stored and are available.

At step 1010, the system receives a query (DVR Path Trace Request). As shown at 1012, a query comprises at least a source node (ingress), destination node, an event time window start time (T1), and an event time window end time (T2). As represented by steps 1014 and 1016, for each of the start time, T1, and the end time, T2, the system initiates a path trace process. The process is essentially identical for both times and, thus, is shown in a single flow through the rest of the steps in the flowchart with the time represented generically as Tx, with the understanding that Tx corresponds to T1 or T2, respectively.

In step 1018, the system recreates the RIB at the time of the most recent IGP snapshot file 100 preceding that time (T1 or T2).

In step 1020, the system checks the update files 105 to determine and apply all RIB updates that occurred between the time of the most recent preceding snapshot and the time (T1 or T2).

At step 1022, the system attempts to determine an egress-pe for the destination node, e.g., using a longest prefix match.

At step 1024, the system checks whether an egress-PE was found. If not, flow proceeds to step 1026, where the system returns a message (user interface) indicating that it found no route between the source node and the destination node for that time, Tx. For such a case, no further processing is necessary.

If, on the other hand, at least one route is determined for Tx, the process instead continues to step 1028. In step 1028, the system determines whether there was more than one potential path at time Tx. If so, flow proceeds to step 1032, in which the system returns multiple egress-PEs for further processing. Specifically, flow proceeds from step 1032 to step 1034, wherein the system runs a BGP Best Path Algorithm to select one of the multiple potential paths to indicate as the best path. The system also determines what factor was the tie breaker that caused the selected best path to be selected as such.

If, on the other hand, it is determined in step 1028 that there was only one path at time Tx, flow instead proceeds to step 1030, in which the system returns the one egress-PE for further processing.

In either event, flow then proceeds from either step 1034 or step 1030 to step 2036, wherein the system builds an IGP interconnected topology based on the most recent snapshot preceding time Tx.

Next, in step 1038, the system applies any updates between the time of the most recent preceding snapshot and time Tx to create a new topology at time Tx.

Next, in step 1040, the system runs a Dijkstra's Shortest Path Algorithm from the ingress node/device to the egress-pe(s) to determine the path that a data packet would have taken from ingress to egress in the network at that time. If there were multiple egress-PEs, it will determine all potential paths and note which one was determined to be best path.

In step 1042, the system determines the corresponding reverse path(s) from the egress-PE(s) to the ingress device/node.

Next, in step 1044, the system determines whether the forward and reverse paths are symmetrical.

Next, in step 1046, the system looks up the physical topology at time Tx to determine the upstream and downstream links in the paths (e.g., the specific ports of the nodes that the data entered and exited the node).

Finally, at step 1048, the system generates a response to the query, the response including a list of the relevant paths, links, best path (if applicable), and forward/reverse symmetry determination and other information such as shown in FIGS. 4-9 during the event time window between T1 and T2.

CONCLUSION

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs).

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), quantum computer, and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

Moreover, the claims should not be read as limited to the provided order or elements unless stated to that effect. In addition, use of the terms "means for" in any claim is intended to invoke 35 U.S.C. § 112, 16 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

The invention claimed is:

1. A non-transitory computer-readable device comprising instructions, which, when executed by a processor, cause the processor to perform operations, the operations comprising:
   receiving a query identifying a source device in a communication network, a destination device in the communication network, and a time of interest;
   accessing a snapshot of a state of the communication network at a time preceding the time of interest, the snapshot comprising a topology of the communication network and a Routing Information Base (RIB) of the communication network at the time preceding the time of interest;
   accessing a set of network updates, the set of network updates comprising all updates to the topology and RIB of the communication network that occurred between the snapshot of the state of the communication network preceding the time of interest and the time of interest;
   generating, based on the snapshot of the state of the communication network at the time preceding the time of interest and the set of network updates, a RIB and a topology of the communication network at the time of interest;
   determining, based on the generated RIB and topology of the communication network at the time of interest, at least one path through the communication network that a data packet intended for transmission from the source device to the destination device would have traversed at the time of interest; and
   generating a report indicating the at least one path, the report comprising at least an ordered list of network nodes in the at least one path.

2. The non-transitory computer-readable device of claim 1 wherein the query pertains to a data packet that was incorrectly transmitted between the source device and the destination device at the time of interest, and wherein the operations further comprise:
   using the report to determine a node in the communication network that could have caused the incorrect transmission of the data packet between the source device and the destination device at the time of interest.

3. The computer-readable device of claim 1 wherein the time of interest comprises a period of time defined by a start time and an end time, wherein accessing the snapshot comprises:
   accessing a snapshot of a state of the communication network at a time preceding the start time;

accessing a first set of network updates, the first set of network updates comprising all updates to the topology and RIB of the communication network that occurred between the snapshot of the communication network at the time preceding the start time and the start time;

generating, based on the snapshot of the state of the communication network at the time preceding the start time and the first set of updates, a RIB and a topology of the communication network at the start time;

accessing a snapshot of a state of the communication network at a time preceding the end time;

accessing a second set of network updates, the second set of network updates comprising all updates to the topology and RIB of the communication network that occurred between the snapshot of the state of the communication network at the time preceding the end time and the end time; and generating, based on the snapshot of the state of the communication network at the time preceding the end time and the second set of updates, a RIB and a topology of the communication network at the end time.

4. The non-transitory computer-readable device of claim 3 wherein the operations further comprise:

generating, based on the generated RIB and a topology of the communication network at the start time, a report of at least one path through the communication network that a data packet intended for transmission from the source device to the destination device would have traversed at the start time; and generating, based on the generated RIB and a topology of the communication network at the end time, a report of at least one path through the communication network that a data packet intended for transmission from the source device to the destination device would have traversed at the end time.

5. The non-transitory computer-readable device of claim 3 further comprising:

storing snapshots of the state of the communication network at first intervals of a first duration; and storing, at second intervals smaller than the first intervals, update reports, wherein each update report comprises updates that occurred between a time of an immediately preceding snapshot or an immediately preceding update report and a current update report.

6. The non-transitory computer-readable device of claim 5 wherein the operation of accessing the snapshot of a state of the communication network at a time preceding the start time comprises accessing a most recent stored snapshot of the communication network preceding the start time and wherein the operation of accessing the snapshot of a state of the communication network at a time preceding the end time comprises accessing a most recent stored snapshot of the communication network preceding the end time.

7. The non-transitory computer-readable device of claim 6 wherein the most recent stored snapshot of the communication network preceding the start time and the most recent stored snapshot of the communication network preceding the end time are different snapshots.

8. The non-transitory computer-readable device of claim 6 wherein the most recent stored snapshot of the communication network preceding the start time and the most recent stored snapshot of the communication network preceding the end time are the same snapshot.

9. The non-transitory computer-readable device of claim 5 wherein the first intervals are between 6 and 24 hours and the second intervals are between 5 and 30 minutes.

10. The non-transitory computer-readable device of claim 5 wherein the first intervals are 12 hours and the second intervals are 10 minutes.

11. The non-transitory computer-readable device of claim 2, further comprising, if the at least one path comprises multiple paths, executing a BGP best path algorithm to determine which of the multiple paths was a best path, and wherein the operation of generating the report further comprises indicating which of the multiple paths was the best path.

12. The non-transitory computer-readable device of claim 11, wherein the operations further comprise:

determining, based on the generated RIB and topology of the communication network at the time of interest, at least one path through the communication network that a data packet intended for transmission from the destination device to the source device would have traversed at the time of interest.

13. A method of determining a path that a data packet would have taken through a communication network at a time of interest comprising:

receiving a query identifying a source device in a communication network, a destination device in the communication network, and a time of interest;

accessing a snapshot of a state of the communication network at a time preceding the time of interest, the snapshot comprising a topology of the communication network and a Routing Information Base (RIB) of the communication network at the time preceding the time of interest;

accessing a set of network updates, the set of network updates comprising all updates to the topology and RIB of the communication network that occurred between the snapshot of the state of the communication network preceding the time of interest and the time of interest;

generating, based on the snapshot of the state of the communication network at the time preceding the time of interest and the set of network updates, a RIB and a topology of the communication network at the time of interest;

determining, based on the generated RIB and topology of the communication network at the time of interest, at least one path through the communication network that a data packet intended for transmission from the source device to the destination device would have traversed at the time of interest; and generating a report indicating the at least one path, the report comprising at least an ordered list of network nodes in the at least one path.

14. The method of claim 13 wherein the query pertains to a data packet that was incorrectly transmitted between the source device and the destination device at the time of interest, and wherein operations further comprise:

using the report to determine a node in the communication network that could have caused the incorrect transmission of the data packet between the source device and the destination device at the time of interest.

15. The method of claim 13 wherein the time of interest comprises a period of time defined by a start time and an end time, wherein accessing the snapshot comprises:

accessing a snapshot of a state of the communication network at a time preceding the start time;

accessing a first set of network updates, the first set of network updates comprising all updates to the topology and RIB of the communication network that occurred between the snapshot of the communication network at the time preceding the start time and the start time;

generating, based on the snapshot of the state of the communication network at the time preceding the start time and the first set of updates, a RIB and a topology of the communication network at the start time;

accessing a snapshot of a state of the communication network at a time preceding the end time;

accessing a second set of network updates, the second set of network updates comprising all updates to the topology and RIB of the communication network that occurred between the snapshot of the state of the communication network at the time preceding the end time and the end time; and generating, based on the snapshot of the state of the communication network at the time preceding the end time and the second set of updates, a RIB and a topology of the communication network at the end time.

16. The method of claim 15 further comprising:

generating, based on the generated RIB and a topology of the communication network at the start time, a report of at least one path through the communication network that a data packet intended for transmission from the source device to the destination device would have traversed at the start time; and generating, based on the generated RIB and a topology of the communication network at the end time, a report of at least one path through the communication network that a data packet intended for transmission from the source device to the destination device would have traversed at the end time.

17. The method of claim 15 further comprising:

storing snapshots of the state of the network at first intervals of a first duration; and storing, at second intervals smaller than the first intervals, update reports, wherein each update report comprises updates that occurred between a time of an immediately preceding snapshot or an immediately preceding update report and a current update report.

18. The method of claim 17 wherein accessing the snapshot of a state of the communication network at a time preceding the start time comprises accessing a most recent stored snapshot of the communication network preceding the start time and wherein accessing the snapshot of a state of the communication network at a time preceding the end time comprises accessing a most recent stored snapshot of the communication network preceding the end time.

19. The method of claim 14 further comprising, if the at least one path comprises multiple paths, executing a BGP best path algorithm to determine which of the multiple paths was a best path, and wherein the operation of generating the report further comprises indicating which of the multiple paths was the best path.

20. The method of claim 19 further comprising:

determining, based on the generated RIB and topology of the communication network at the time of interest, at least one path through the communication network that a data packet intended for transmission from the destination device to the source device would have traversed at the time of interest.

* * * * *